(No Model.)
J. T. YOUNG.
AXLE LUBRICATOR.
No. 304,483. Patented Sept. 2, 1884.
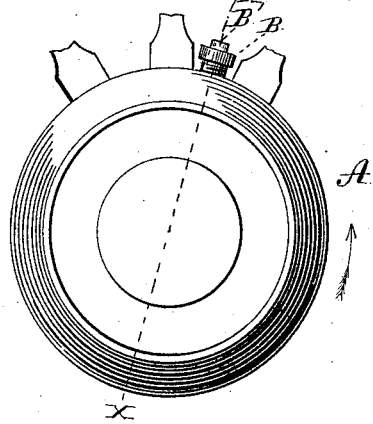
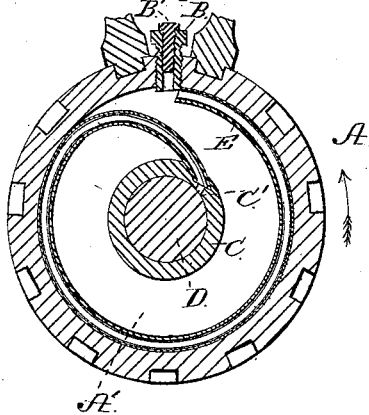
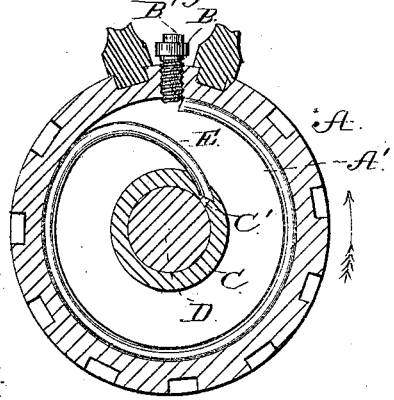
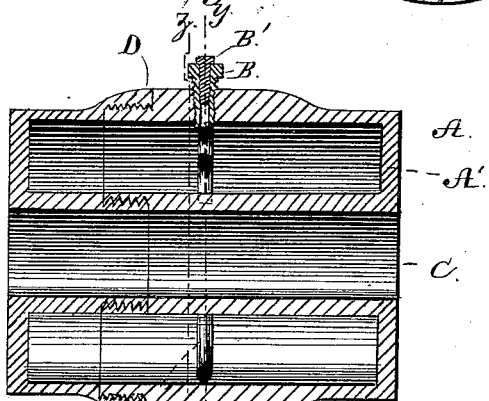
WITNESSES
H. A. Clark
P. B. Turpin
INVENTOR
John T. Young
By R. S. & A. P. Lacey
Attorneys

UNITED STATES PATENT OFFICE.

JOHN THOMAS YOUNG, OF VINCENNES, INDIANA.

AXLE-LUBRICATOR.

SPECIFICATION forming part of Letters Patent No. 304,483, dated September 2, 1884.

Application filed March 6, 1884. (No model.)

*To all whom it may concern:*

Be it known that I, JOHN T. YOUNG, a citizen of the United States, residing at Vincennes, in the county of Knox and State of Indiana, have invented certain new and useful Improvements in Axle-Lubricators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to axle and shaft lubricators; and it consists in the novel construction, combination, and arrangement hereinafter described and claimed.

In the drawings, Figure 1 is an end view of a hub constructed according to my invention. Fig. 4 is a longitudinal section of same on line $x\ x$, Fig. 1. Figs. 2 and 3 are transverse sections of the hub on respectively lines $y\ y$ and $z\ z$, Fig. 4, all of which will be explained.

The hub A is made hollow or provided with a suitable annular chamber, A'. This chamber may extend the full length of the hub, as shown in Fig. 4, or be contracted to any suitable size. This chamber is the oil-reservoir. An opening is cut through the hub into this chamber, and an externally and internally threaded bushing or tube, B, is turned therein. A threaded plug, B', turns into the tube and prevents the egress of oil when the wheel or pulley is in use. It is manifest that this tube and threaded plug might be dispensed with and the opening in the hub closed by any simple plug or bung; but for the purposes of security I prefer the tube and threaded plug, as before described. By removing plug B' the supply of oil may be poured into the chamber A'. The bearing tube or boxing C, which surrounds the spindle or shaft, is provided with a radial lubricating-aperture, C', through which oil is fed, in the manner presently described, to the shaft or spindle D. A feed-tube, E, has its outer end secured to the peripheral wall of the chamber A', and is coiled thence in the transverse plane of opening C', almost entirely around the chamber, in a curve concentric therewith. It is then bent in toward the tube or boxing C, and its inner end is made fast to and opens into the feed-opening C' thereof. The direction of this tube from its outer to its inner end, when the hub is in motion, is opposite the line of such motion, which is as indicated by arrow in Figs. 1, 2, and 3. Thus in operation, as the hub is revolved, the outer end of the tube which opens into the chamber A' catches up the oil, which is conveyed through said tube as the revolution continues, and is delivered onto the shaft or spindle. By this means the said parts are properly lubricated while in motion.

It is obvious that the length and degree of curve of the feeding may be varied without departing from the principle of my invention, though I prefer the construction as shown and before described.

In manufacturing my hub it may be made in sections, screw-threaded together at D, as shown in Fig. 4, and the tube E be secured on one of the sections before the other one, or cap, is turned on; or the hub might be cast in one piece, the part E being suitably arranged in the molder's flask. I do not, however, desire to be limited to any particular method of making the hub.

My invention is alike applicable to vehicle-wheels and band-wheels, eccentrics, or pulleys.

It will be seen that the plug B has its inner end arranged close to the outer open end of tube E, and may be turned out, so as to wholly clear said end, or in, to any point desired, acting as a valve to vary the mouth of the feed-pipe and regulate the feed, or to entirely close same, as will be fully understood from the drawings.

Having thus described my invention, what I claim, and desire to secure by Letters Patent, is—

1. In a lubricator, the combination, with the chambered hub provided with a suitable feed-opening, and having a lubricating-aperture leading from its chamber through its central bearing tube or box, of the feed-tube having its outer end opening into the oil-chamber, close to the peripheral wall thereof, and its inner end connected with and adapted to deliver oil into the lubricating-aperture, said feed-tube being curved, substantially as and for the purposes set forth.

2. The combination of the hub provided with chamber A' and a feed-opening, and having its bearing tube or boxing provided with a lubricating-aperture, the externally and internally threaded tube or bushing B, the threaded plug B', and the feed-pipe E, all arranged and adapted to operate substantially as and for the purposes specified.

3. The herein-described wheel-hub provided with a chamber or reservoir, A', and bearing tube or box C, having a lubricating-aperture, C', and having a curved feed-tube opening at its outer end into the chamber or reservoir, and having its inner end connected with the aperture C', substantially as set forth.

4. The combination of the hub having a chamber, A', and the bearing tube or boxing provided with aperture C', of the feed-tube and a valve adjustable over the mouth of said opening, substantially as set forth.

In testimony whereof I affix my signature in presence of two witnesses.

JOHN THOMAS YOUNG.

Witnesses:
HENRY S. CAUTHORN,
JULIUS A. BREIVOGEL.